Figure 2:
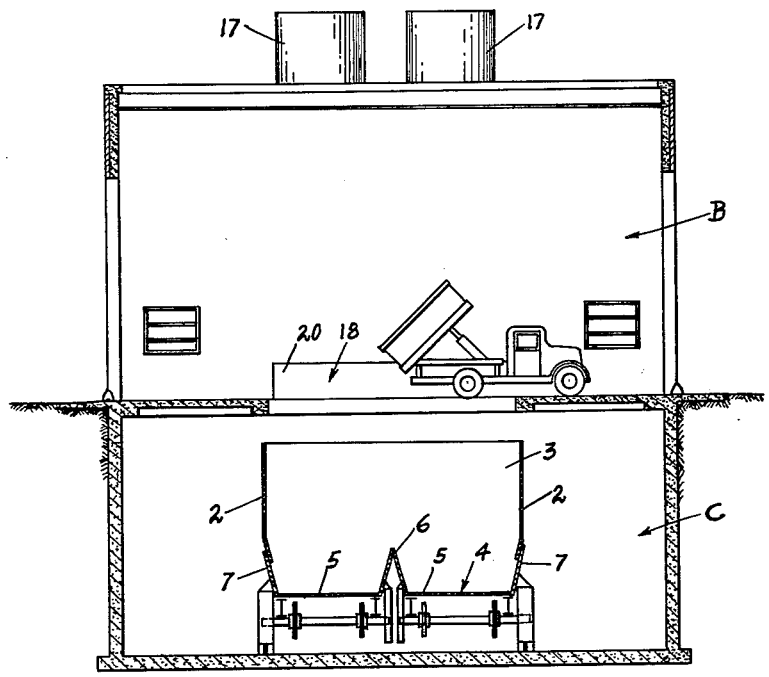

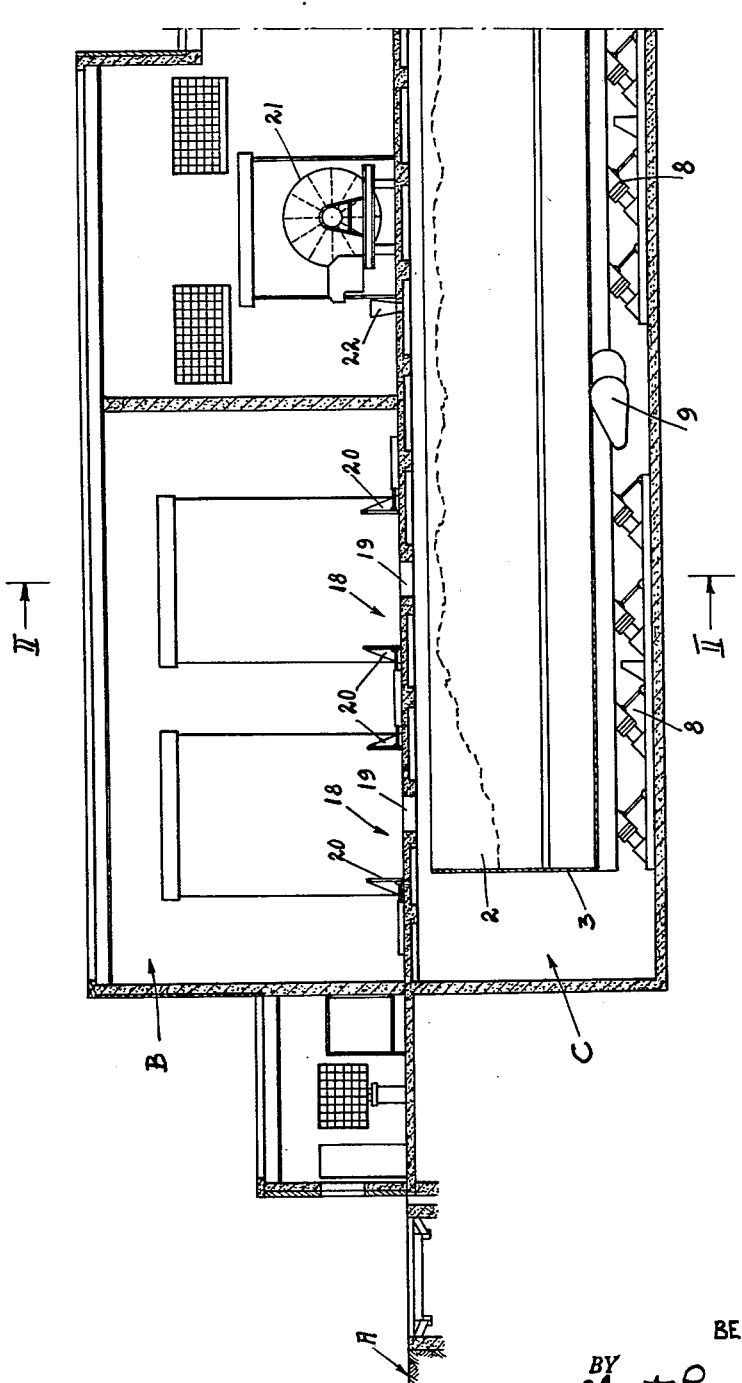

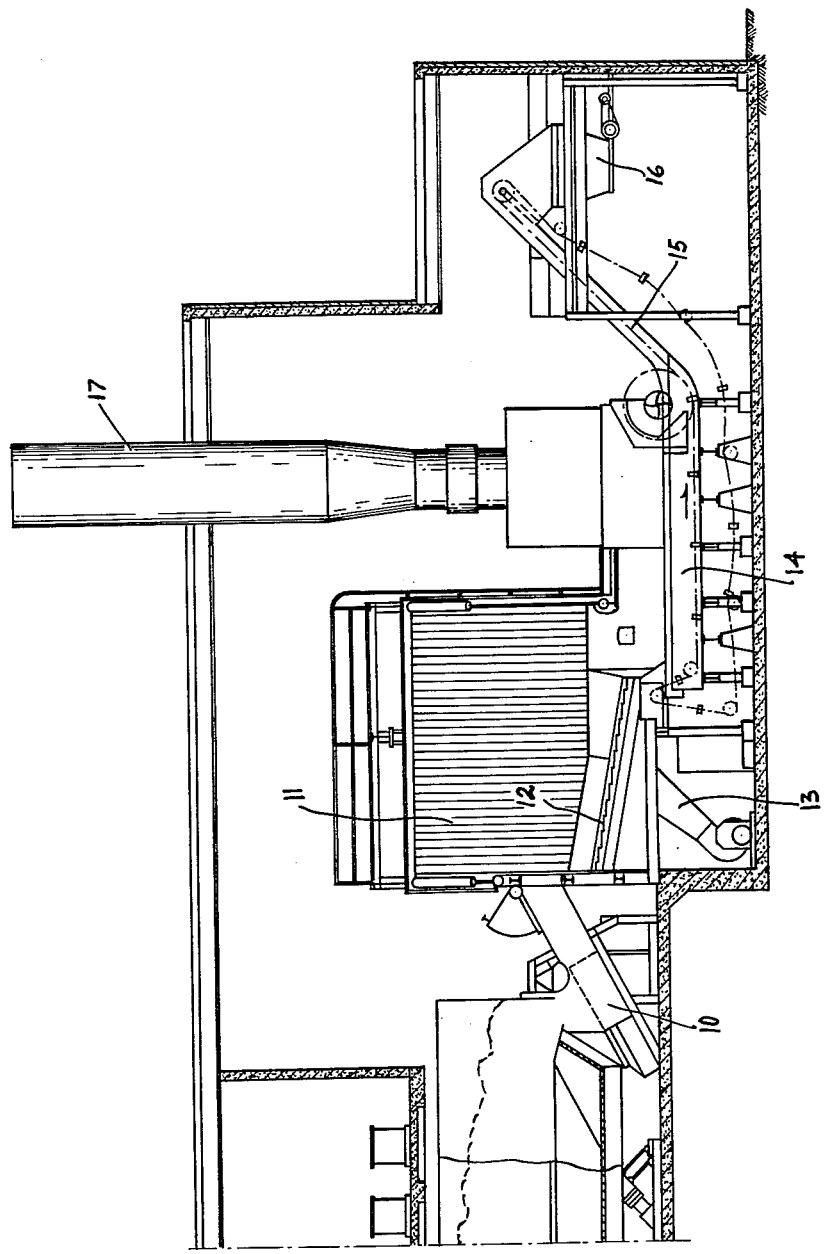

United States Patent Office 3,060,869
Patented Oct. 30, 1962

3,060,869
SEWAGE SLUDGE DISPOSAL
Bertram B. Reilly, Pittsburgh, Pa., assignor to Drano Corporation, Pittsburgh, Pa., a corporation of Pennsylvania
Filed May 11, 1960, Ser. No. 28,472
1 Claim. (Cl. 110—8)

This invention relates to the disposal of sewage sludge, and more especially to the disposal of sludge by incineration.

Sewage sludge resulting from the operation of municipal sewage plants is commonly dewatered by filtering and disposed of by incinerating it. It contains large amounts of moisture, and is a dense, compact mass that is difficult to handle and cannot be easily dried in advance of being burned. As a result, the fuel cost of disposal is high, and objectionable odors are likely to result from the burning of it, even in equipment especially designed for the purpose.

In my copending application Serial No. 830,380, filed July 29, 1959, there is disclosed an incinerator for the disposition of municipal rubbish. It is characterized by the provision of a combined storage hopper and conveyor designed to receive rubbish from dump trucks and convey it to the incinerator. It is capable of accepting material at a much higher rate than the material is consumed, so that while collection of rubbish may continue over an eight-hour day, for example, the incinerator may operate perhaps twenty-four hours, or for such longer period of time as is required to dispose of the day's accumulation. More specifically, the plant has an elongated pit in which is an elongated bin, the bottom of which is formed by one or more vibratory or shaking conveyors, for advancing material from the receiving end of the pit to the incinerator at the opposite end of the pit. There are high stationary sides for the bin, so that the material can be stored to a considerable depth, thereby enabling the conveyor to receive material at a much higher rate than it is consumed, and in slack periods work off the accumulation. This avoids the objectionable practice of dumping the refuse into a receiving pit and transferring it with a grab bucket to a furnace feeding conveyor, and facilitates the rapid and safe dumping of the trucks.

The rubbish is mostly combustible and the shaking conveyor that feeds the rubbish shifts and agitates the rubbish as it is advanced from the storage bin to the incinerator. I have found that if the sludge cake is dumped onto the rubbish as the rubbish is moved along the bin, it is gradually broken up and diffused through the rubbish, and when it is introduced into the incinerator chamber it is distributed through the mass of rubbish. Some of the residual water in the sludge is absorbed into the rubbish so that the water content of the sludge is lowered and the sludge spread over, and through the rubbish is much more readily incinerated than in the conventional sludge incinerating plant. At the same time, municipal plant investment is substantially reduced, since one incinerator and one crew dispose of the two waste materials.

This invention has for its principal object, therefore, to provide an improved method of and apparatus for the incineration of sewage sludge by distributing it through and over consumable rubbish and incinerating the mixture.

In the drawings, which show schematically a typical incinerator plant embodying this invention:

FIGS. 1A and 1B are complementary longitudinal sectional views through the plant; and FIG. 2 is a transverse vertical section in the plane of line II—II of FIG. 1.

Referring to the drawings, the ground level is indicated at A. The main building B is over a long narrow pit C. Within the pit is an elongated bin having high side walls 2 and an end wall 3 at the receiving end. The plant here shown has the bottom of the bin 4 formed with parallel flat reaches 5 with a central separator and bracing structure 6, and sides 7 that lap the sides 2 of the bin, but which are separate therefrom so that the bottom may move in the required manner to convey material to the discharge end. The bottom is carried on a system of supports 8 with an eccentric mechanism schematically indicated at 9 for imparting successive upward and forward thrusts to the bottom, this type of vibratory conveyor and mechanism being well known in the conveyor art, and forming no part of this invention.

At the end of the conveyor remote from the receiving end the material is delivered to a furnace feeder schematically indicated at 10 that forces the material into an incinerator furnace designated 11. In the furnace is a stoker grate 12 on which the refuse is burned, there being a forced draft fan at 13. At 14 there is indicated a water trough into which unburned refuse falls from the stoker and is carried by a refuse removal system 15 to a storage hopper 16. This system is fully disclosed in my copending application Serial No. 774,971, filed November 19, 1958, now Patent No. 2,983,234. The flue gases leave the furnace chamber over the tank or trough 14, and enter a stack 17 through scrubber, such as that shown in the said copending application.

Over the receiving end of the bin there is an unloading station, which as here shown, has parallel bridge structures 18 extending across the bin, each bridge having an open central area 19 through which rubbish may fall from a dump truck into the bin. Pushers 20 shove refuse from the bridge areas 18 over which the trucks travel into the openings 19. This arrangement is the subject of copending application Serial No. 830,380 previously referred to.

Rubbish and burnable refuse in large quantities can be stored in the bin and moved to the furnace feeder at a rate suited to the capacity of the incinerator. Because of the shaking conveyor forming the bottom of the bin, the refuse is agitated and churned about as it feeds toward the furnace.

In the building between the truck unloading station and the furnace there is a floor area D over the pit and bin. On this floor area there is located a vacuum filter indicated schematically at 21 for dewatering the sludge. Actually the filter cake still retains a substantial amount of moisture. It is discharged from the filter into hopper 22. From the hopper the sludge falls into the storage bin, falling onto the accumulated mass of refuse and rubbish. As the rubbish is from time to time agitated and churned, the sludge masses are broken up and the sludge distributed therethrough. Being broken up, some of the residual water in the filter cake will evaporate, and some will be absorbed into the rubbish. The sludge is fed along in this distributed and broken up condition with the rubbish into the furnace where it is consumed.

There is a high temperature in the incinerator because of the forced draft, the use of auxiliary fuel where necessary, and the highly combustible nature of much of the refuse. It has been found that burned in this way the sludge is effectively incinerated, labor is reduced, fuel values in the rubbish which would normally be lost aid in the burning of the sludge, and one plant and one work crew perform the work normally required of two. The use of separate sludge drying equipment is eliminated, and fuel requirements are reduced.

It will be understood that I have shown a typical plant for practicing my invention, but the plant need not be of the specific structure shown, and various modifications and changes may be made within the contemplation of my invention.

I claim:

Apparatus for incinerating loose dry rubbish and partially dewatered compacted sewage sludge comprising an elongated storage bin having side walls and a bottom forming a U-shaped cross-section, means connected to the bin for imparting upward and forward thrusts to the bin as a unit for conveying material placed in the bin in similar upward and forward thrusts in the direction of conveying, a rubbish receiving station at one end of the bin positioned to discharge rubbish into the bin, a sludge receiving station intermediate the ends of the bin positioned to discharge sludge into the bin and upon rubbish accumulated in the bin at this station, an incinerator feeder at the end of the bin opposite the rubbish station in communication with the bin for gravity discharge of comminuted rubbish and sludge thereon, the rubbish distributively absorbing the water of the partially dewatered sludge and abrading the sludge to break compacted sludge into smaller particles in the bin between the sludge receiving station and the incinerator feeder, and an incinerator disposed for receiving material from the feeder for incineration.

References Cited in the file of this patent

UNITED STATES PATENTS

| | | |
|---|---|---|
| 1,772,285 | Knittle | Aug. 5, 1930 |
| 2,045,115 | Allen et al. | June 23, 1936 |
| 2,213,668 | Dundas et al. | Sept. 3, 1940 |
| 2,684,754 | Bankauf et al. | July 27, 1954 |

UNITED STATES PATENT OFFICE
CERTIFICATE OF CORRECTION

Patent No. 3,060,869

October 30, 1962

Bertram B. Reilly

It is hereby certified that error appears in the above numbered patent requiring correction and that the said Letters Patent should read as corrected below.

In the grant, lines 2 and 12, and in the heading to the printed specification, lines 3 and 4, for "Drano Corporation", each occurrence, read -- Dravo Corporation --.

Signed and sealed this 23rd day of April 1963.

(SEAL)
Attest:

ERNEST W. SWIDER
Attesting Officer

DAVID L. LADD
Commissioner of Patents